(12) United States Patent
Balbinot

(10) Patent No.: US 11,249,527 B2
(45) Date of Patent: Feb. 15, 2022

(54) SYSTEM FOR CONTROLLING THE ELECTRICAL POWER SUPPLY OF AN AIRCRAFT

(71) Applicant: ZODIAC AERO ELECTRIC, Montreuil (FR)

(72) Inventor: Jean-Pierre Balbinot, Le Kremlin-Bicetre (FR)

(73) Assignee: Zodiac Aero Electric, Montreuil (FR)

( * ) Notice: Subject to any disclaimer, the term of this patent is extended or adjusted under 35 U.S.C. 154(b) by 473 days.

(21) Appl. No.: 15/225,067

(22) Filed: Aug. 1, 2016

(65) Prior Publication Data

US 2017/0031400 A1 Feb. 2, 2017

(30) Foreign Application Priority Data

Jul. 31, 2015 (FR) ...................................... 1557394

(51) Int. Cl.
*G06F 1/26* (2006.01)
*H02J 4/00* (2006.01)
*G05B 9/03* (2006.01)

(52) U.S. Cl.
CPC .................. *G06F 1/26* (2013.01); *G05B 9/03* (2013.01); *H02J 4/00* (2013.01); *B64D 2221/00* (2013.01)

(58) Field of Classification Search
CPC ....................................................... G06F 1/26
See application file for complete search history.

(56) References Cited

U.S. PATENT DOCUMENTS

| | | |
|---|---|---|
| 7,007,179 B2 | 2/2006 | Mares et al. |
| 2005/0185352 A1 | 8/2005 | Nguyen |
| 2010/0167678 A1* | 7/2010 | Yoshikawa ...... H03K 3/356017 455/296 |
| 2011/0025457 A1* | 2/2011 | Tsui .......................... G05B 9/02 340/5.7 |
| 2013/0057241 A1* | 3/2013 | Shuvalov ............. H03K 17/122 323/271 |
| 2014/0015449 A1* | 1/2014 | Biester ................ E21B 33/0355 318/51 |
| 2015/0249389 A1* | 9/2015 | Cummings ........... H02M 3/335 363/21.12 |

\* cited by examiner

*Primary Examiner* — Paul Yen
(74) *Attorney, Agent, or Firm* — Morgan, Lewis & Bockius LLP

(57) ABSTRACT

A system for controlling electrical power supply of an aircraft includes at least two control boards and at least two switching members. Each switching member is connected to each control board. Each control board includes a processor. Each processor is configured to determine a command for switching states of switch contacts of each switching member and to determine information relating to validity of each switching command. Each switching member includes a transmitter to determine a command to be transmitted to a detector to detect parallelization, a power actuator configured to transmit a power signal to the switch contacts depending on the command received from the detector, and switch contacts configured to selectively open or close an electrical power supply line. The command is selected from the switching commands and the information relating to the validity of each switching command.

8 Claims, 2 Drawing Sheets

SYSTEM FOR CONTROLLING THE ELECTRICAL POWER SUPPLY OF AN AIRCRAFT

CROSS-REFERENCE TO RELATED APPLICATION

This application claims priority under 35 U.S.C. 119(a) to French Patent Application No. 1557394, filed on Jul. 31, 2015, which is incorporated herein by reference in its entirety for all purposes.

TECHNICAL FIELD

This disclosure relates generally, to the control of electrical distribution systems and, more particularly, the safe control of such systems.

BACKGROUND

An aircraft generally has an electrical system including, in particular, a primary electrical power distribution system and a secondary distribution system. This secondary distribution system allows the electrical power originating from internal sources, e.g. generators or batteries, or external sources, e.g. ground power units, to be protected and distributed.

The secondary distribution system generally includes switching members that are controlled, in particular, by Electrical Network Management Unit (ENMU) control boards.

Switching members are interchangeable modular elements, controlling electrical power supply lines that generally benefit from redundancy for the most critical among them. Control boards form a crucial and central part in the management of the distribution of electricity in an aircraft. Control boards are elements designed for specific tasks and are difficult to interchange or replace. During the maintenance of an aircraft, it is thus easier to change a switching member than a control board.

Generally, systems for controlling switching members including at least two control boards 1, 3, each connected to a switching member 2, 4, are known to one of ordinary skill in the art, and FIG. 1 illustrates such a system. As illustrated in FIG. 1, control boards 1, 3 each include a corresponding processor 5a, 5b, a corresponding transmitter 6a, 6b, for determining the command to be transmitted, a corresponding detector 7a, 7b for detecting parallelization, and a corresponding power actuator 8a, 8b, connected in series.

The processors 5a, 5b receive items of information from sensors and instructions from the control boards 1, 3 or from switching members 2, 4 for interpreting commands from the aircraft, and determine switching states of the switching members 2, 4 that are connected thereto. The transmitters 6a, 6b, which determine the command to be transmitted, receive control signals and command validity signals from the processors 5a, 5b, compare the signals received from the processor 5a, 5b to determine whether the signals are valid, and transmit a corresponding command.

The detector 7a, 7b makes it possible to check that no voltage is present on either side of the switch contacts 9a, 9b before closing in order to avoid connecting two electrical sources to one another. If voltage is present, the close command is not transmitted to the power actuators 8a, 8b and the switch contacts 9a, 9b remain open.

The power actuator 8a, 8b receives the command relating to the switching state of the switch 9a, 9b in the form of a low current, and transmits a power signal to the switch 9a, 9b in order to trigger the switching thereof.

Generally, each switching member 2, 4 includes only one of switch contacts 9a, 9b.

FIG. 1 illustrates that the control system includes crossed connections 10a, 10b between the control boards 1, 3, allowing redundancy of the processors 5a, 5b to be established. Thus, a processor 5a of the first control board 1 is connected, at output, to the transmitter 6a of the first control board 1, as well as to the transmitter 6b of the second control board 3. Likewise, the processor 5b of the second control board 3 is connected at output to the transmitter 6b of the second control board 3, as well as to the transmitter 6a of the first control board 1.

Although the processors 5a, 5b exhibit redundancy, the system requires two control boards 1, 3 in order to operate. Although a single processor 5a, 5b suffices for controlling the two switch contacts 9a, 9b, it is, for example, impossible for the processor 5a to control the switch contact 9b if the control board 3 is destroyed or otherwise absent. Moreover, the current consumed by the coil of the switching member must be withstood by the wiring between the latter and the control board.

Each transmitter 6a, 6b receives four items of information, including the validity information and the command from the processor 5a of the first control board 1 and the validity information and the command from the processor 5b of the second control board 3.

Such a control system is equipped, in particular, in an A380™ type of aircraft.

FIG. 2 illustrates a second type of control system. As illustrated in FIG. 2, a control board 1 includes a processor 5a, a transmitter for determining the command to be transmitted 6a, and a detector for detecting parallelization 7a, connected in series.

Each switching member 2, 4 includes a corresponding power actuator 8a, 8b and corresponding switch contacts 9a, 9b. The power actuator 8a, 8b is connected to the control input of the corresponding switch contacts 9a, 9b, allowing the switching state, conducting or non-conducting, to be chosen.

Such a control system is equipped, in particular, in an A380™ type of aircraft.

FIG. 2 illustrates that the control system of FIG. 2, as compared to the control system illustrated in FIG. 1, includes low-current connections 12a, 12b between the control boards 1, 3 and the switching members 2, 4, instead of power connections 11a, 11. A low-current connection is easier to use due to a reduction in the emission of electromagnetic interference in the rest of the system.

Although this second type of control system is more advanced than that of the first type, the redundancy remains imperfect and two control boards are still required in order for the system to operate.

In addition, conventional control systems use two separate control buses (of CAN type for example) allowing redundancy of the commands for each of the switching members. However, such control systems include the following drawbacks.

As each control bus is connected to multiple switching members, failure of one of the switching members is sufficient to take the corresponding bus out of operation. If two switching members, each connected to a different control bus, fail, the system breaks down.

The use of a control bus involves the use of a more expensive microprocessor, as it is equipped with an interface for managing the bus which increases the cost of the system.

The development of the software or associated logic code requires more expensive certification.

The above information disclosed in this Background section is only for enhancement of understanding of the background and therefore it may contain information that does not form art that is already known in this country to a person of ordinary skill in the art.

SUMMARY

Accordingly, in consideration of the above constraints, various embodiments of this disclosure are directed to providing a control system comprising control boards and switching members in which the control boards exhibit complete redundancy, where the communication between the control board and the switching member is of low-current type.

In accordance with some embodiments, a system for controlling the electrical power supply of an aircraft includes at least two control boards and at least two switching members. Each switching member is connected to each control board. Each control board includes a processor. Each processor is configured to determine a command for switching states of switch contacts of each switching member and to determine information relating to the validity of each switching command. Each switching member includes a transmitter to determine a command to be transmitted to a detector to detect parallelization, a power actuator configured to transmit a power signal to the switch contacts depending on the command received from the detector, and switch contacts configured to selectively open or close an electrical power supply line. The command is selected from the switching commands and the information relating to the validity of each switching command.

Each control board is connected to transmitter through a connection comprising a reference strand and a strand carrying a control current transmitted by the control board.

Each control board is configured to perform modulation of the command for switching the states of the switch contacts of each switching member and the information relating to the validity of each switching command. Each switching member is correspondingly configured to perform demodulation.

The modulation comprises amplitude modulation.

The modulation comprises pulse width modulation.

The modulation comprises dual-tone frequency modulation.

The methods and apparatuses of the various embodiments have other features and advantages which will be apparent from or are set forth in more detail in the accompanying drawings, which are incorporated herein, and the following Detailed Description, which together serve to explain certain principles of the various embodiments of this disclosure.

BRIEF DESCRIPTION OF THE DRAWINGS

For a better understanding of the various described embodiments, reference should be made to the Detailed Description below, in conjunction with the following drawings. Like reference numerals refer to corresponding parts throughout the figures and description.

It should be understood that the appended drawings are not necessarily to scale, presenting a somewhat simplified representation of various features illustrative of the basic principles of the various embodiments of this disclosure. The specific design features of the various embodiments as disclosed herein, including, for example, specific dimensions, orientations, locations, and shapes will be determined in part by the particular intended application and use environment.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first pair could be termed a second pair, and, similarly, a second pair could be termed a first pair, without departing from the scope of the various described embodiments. The first pair and the second pair are both pairs, but they are not the same pair.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
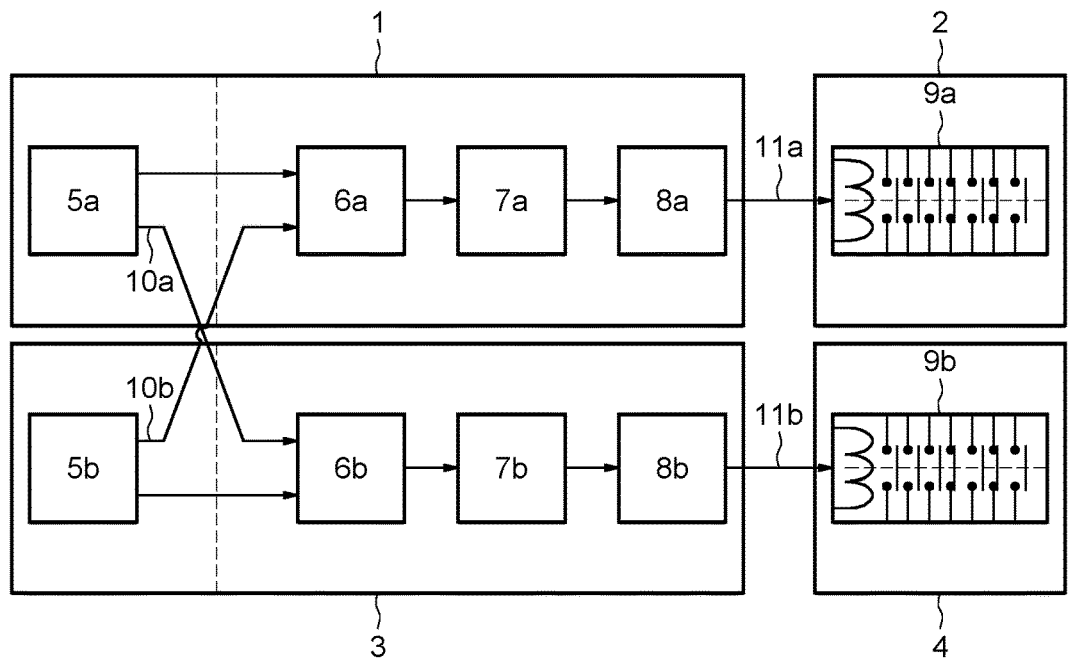
FIG. 1 illustrates the main elements of a conventional first type of control system.
Figure 2:
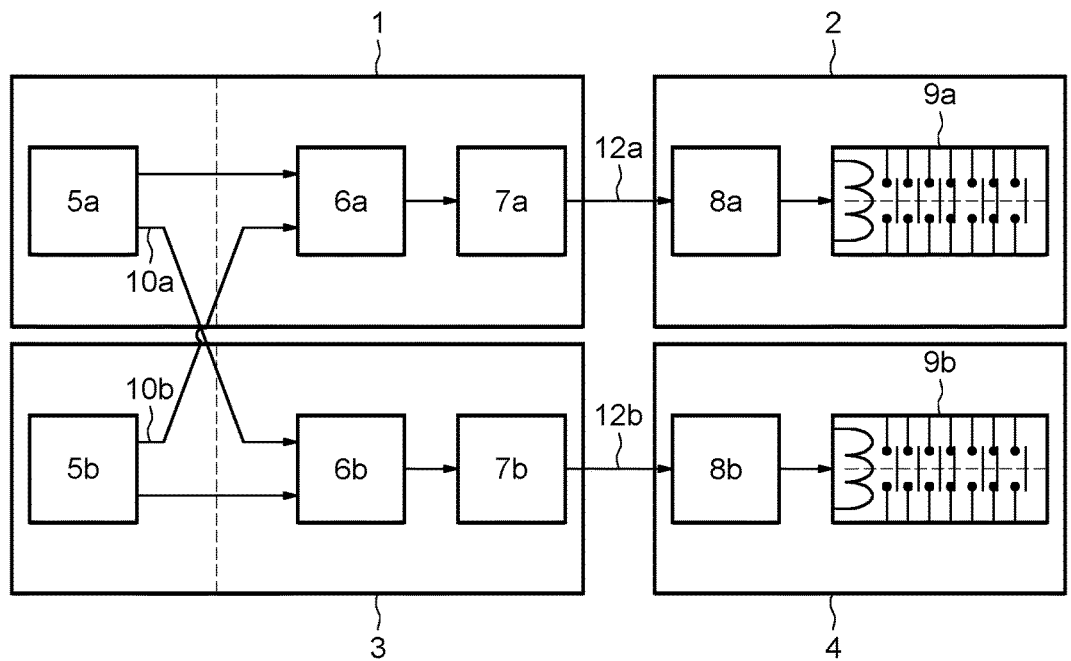
FIG. 2 illustrates the main elements of a conventional second type of control system.
Figure 3:
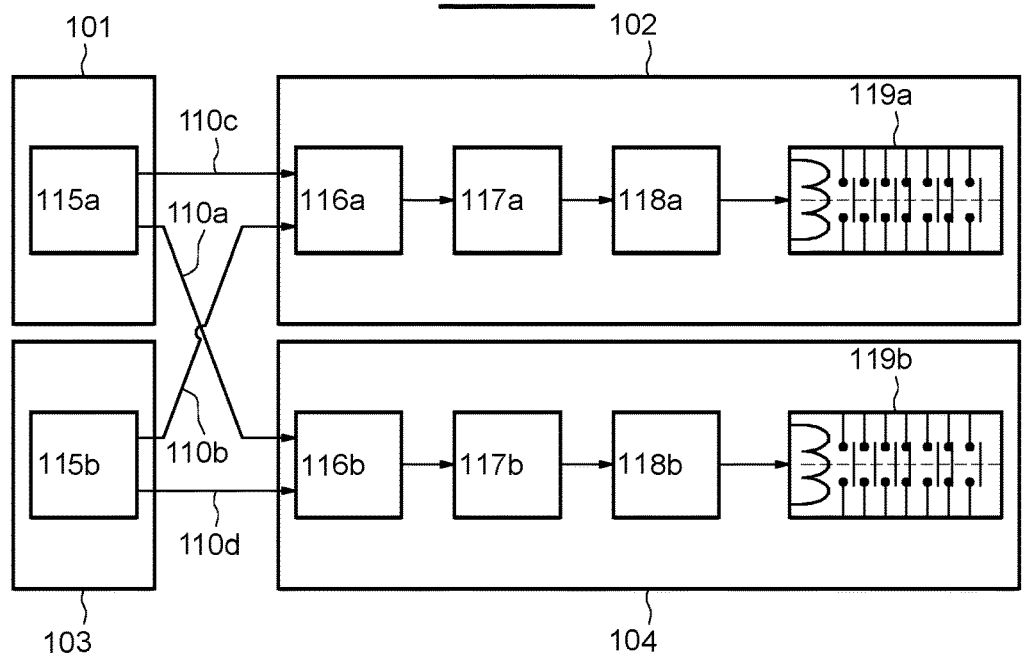
FIG. 3 illustrates the main elements of a control system in accordance with some embodiments.

FIG. 3 illustrates the main elements of a control system in accordance with some embodiments. In some embodiments, as illustrated in FIG. 3, a control system includes two control boards 101, 103, each connected to a corresponding switching member 102, 104. Although the illustrated system includes only two control boards and two switching members, it will be understood upon reading the following description that the system may be generalized to more than two control boards and more than two switching members.

Each control board 101, 103 includes a corresponding processor 115*a*, 115*b*. Thus, the control boards 101, 103 are reduced to their simplest form as compared to the aforementioned conventional control systems, all of the members for converting and interpreting commands being moved to the switching members 102, 104.

In some embodiments, each switching member 102, 104 includes a transmitter 116a, 116b for determining a command to be transmitted, a detector 117a, 117b for detecting parallelization, a power actuator 118a, 118b, and switch contacts 119a, 119b.

Redundancy of the control boards 101, 103 is ensured by connecting the processor 115a of the first control board 101 to the transmitter 116a of the first switching member 102, as well as to the transmitter 116b of the second switching member 104, while the processor 115b of the second control board 103 is connected at output to the transmitter 116a of the first switching member 102, as well as to the transmitter 116b of the second switching member 104.

Thus, the processors 115a, 115b exhibit redundancy and only one protection board is required in order for the system to operate. Specifically, the commands from a control board 101, 103 are transmitted directly to the switching members 102, 104. Moreover, as the control boards are reduced to one processor 105a, 105b, failure of a non-redundant member is prevented, apart from the processor, which would make the board inoperative.

Figure 4:
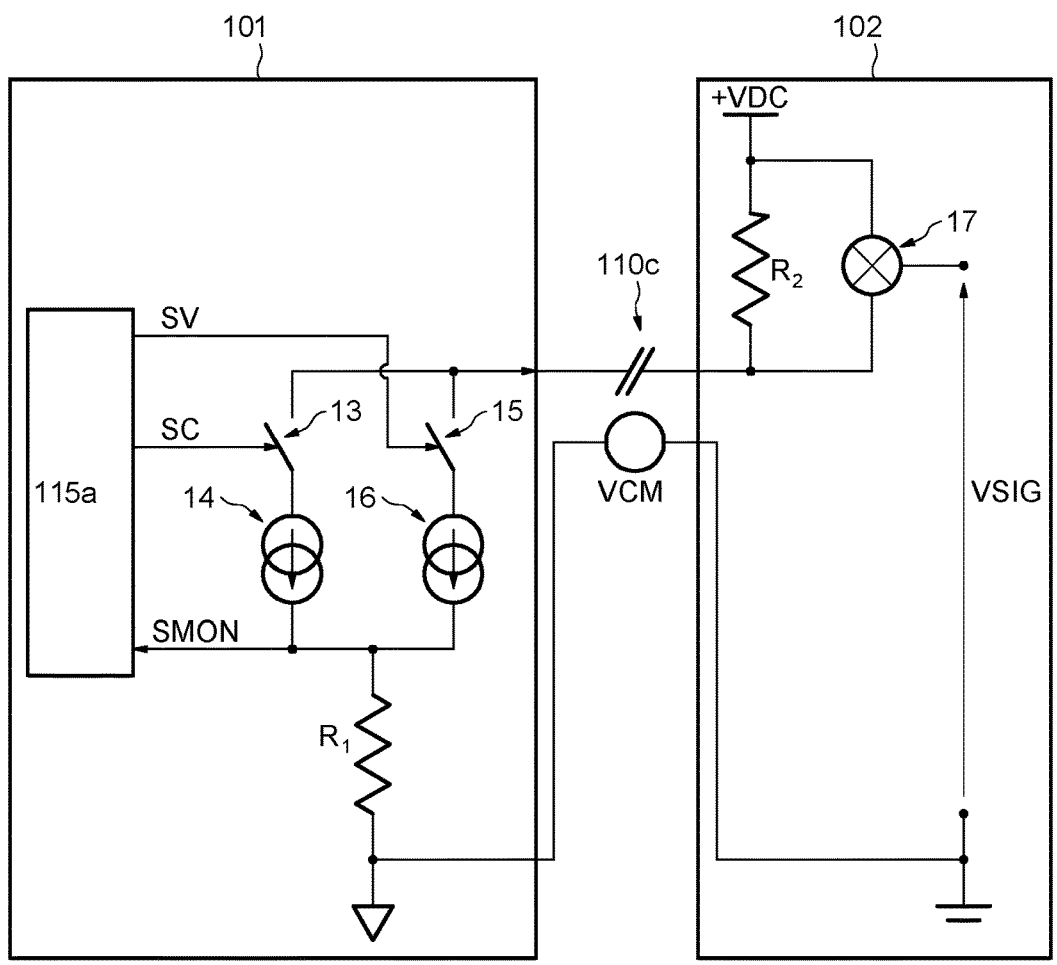
FIG. 4 illustrates main signals exchanged between a control board and a switching member of the control system in accordance with some embodiments.

FIG. 4 illustrates main signals exchanged between a control board and a switching member of the control system in accordance with some embodiments. In particular, FIG. 4 illustrates, in greater detail, the signals exchanged between the first control board 101 and the first switching member 102 via the connection 110c. Although the first control board 101 and the first switching member 102 are used for illustrating the exchanged signals, the same applies to the signals exchanged between the first control board 101 and the second switching member 103 via the connection 110a and between the second control board 103 and the two switching members 102, 104 via the corresponding connections 110b, 110d.

In some embodiments, as illustrated in FIG. 4, the first control board 101, includes the processor 115a that is capable of transmitting a validity signal SV and a control signal SC. In order to limit the number of discrete connections between the control board 101 and the switching member 102, the validity signals SV and the control signals SC are modulated in terms of amplitude of current in order to be transmitted to the switching member 102. In order to achieve this, the control board 101 includes a first switch 13 that is connected in series, on the one hand, to a first output of the switching member 102 and, on the other hand, to a first current source 14.

In some embodiments, the control board 101 also includes a second switch 15 that is connected in series, on the one hand, to the first output of the switching member 102 and, on the other hand, to a second current source 16. The first current source 14 and the second current source 16 are connected to a first terminal of a resistor R1. The resistor R1 is connected, via a second terminal, to a second output of the switching member 102. The processor 115a is connected, via a terminal that is capable of transmitting the control signal SC, to a control terminal of the first switch 13 and, via another terminal that is capable of transmitting the validity signal SV, to a control terminal of the second switch 15.

The control signal SC is thus associated with a first control current value (e.g. 2 mA) when the switching member 102 must be conducting, and with a second current value (e.g. 0 mA) when the switching member 102 must be non-conducting. The validity signal SV is associated with a third control current value (e.g. 1 mA) when the signal is valid, and with a fourth current value (e.g. 0 mA) when the signal is not valid. In order to distinguish between the different contributions of the validity and control signals to the transmitted current, the first and third values must be different.

With the values given by way of example, a transmitted control current of less than 0.5 mA is obtained for an invalid command, from 0.5 mA to 1.5 mA for a valid open command, from 1.5 mA to 2.5 mA for an invalid command, from 2.5 mA to 3.5 mA for a valid close command, and more than 3.5 mA for an invalid command. The transmitted control current is associated with a control voltage via a resistance R1 (e.g. 110. Though recited in terms of certain ranges, it will be understood that all ranges from the lowest of the lower limits to the highest of the upper limits are included, including all intermediate ranges or specific angles within this full range or any specifically recited range.

The command thus carried by the control current and voltage is transmitted over the connector 110c comprising a strand carrying the active signal and a reference strand.

Additionally, in some embodiments, the processor 115a is equipped with a monitoring input allowing a return signal SMON to be received from the switching member 102 to confirm the opening or closing of the switching member 102 through a current loop formed between the control board 101 and the switching member 102. The processor 115a receives the return signal (SMON) via a measurement of the potential at the connection between the resistor R1 and the current sources 14, 16. It should be noted that a choice of low values for the current levels (first, second, third, and fourth values described above) as well as for the resistance R1 allow substantial absorption of a common mode voltage (VCM). In such a system, the transfer time of the command is just as fast as in the case of using a DSI-DSO assembly.

As illustrated in FIG. 4, the input of the switching member 102 may be seen, in which member the control signal transmitted by the control board 101 is demodulated in order to be transmitted to the transmitter 116a. The input of the switching member 102 includes a first terminal connected to the strand of the connector 110c carrying the active signal and a second terminal connected, on the one hand, to the reference strand of the connector 110c and, on the other hand, to the ground of the switching member 102.

In some embodiments, the first input is connected to a resistor R2, which is itself connected in series to a reference potential +VDC. Such a potential may be, for example, a DC electrical power supply rail or bus. A subtractor 17, positioned in parallel to the resistor R2, produces the difference in potentials measured across the terminals of the resistor R2. The subtractor 17 transmits, as output, a potential VSIG that is estimated with respect to ground, proportional to a drop in voltage across the terminals of the resistor R2, and is therefore proportional to the control current transmitted by the control board 101. As the resistances R1 and R2 are known, it is thus possible to associate the values SV and SC with the values taken by the potential VSIG via a lookup table of inverse correspondence that associates the values of the signals SC and SV with the potential VSIG.

In some embodiments, the values of the resistances R1 and R2 are the same. It is then possible to simply go from the value of the transmitted control current to the value of the potential VSIG.

The demodulation of the potential VSIG to signals SC and SV may equally be achieved by an analog system as by a digital system based on a microprocessor coupled to an analog-digital converter. Alternatively, the modulation in terms of amplitude of the current and of the control voltage may be substituted by pulse width modulation (PWM). By way of example, a pulse width of less than 0.5 ms may be chosen for an invalid command, from 0.5 ms to 1.5 ms for a valid open command, from 1.5 ms to 2.5 ms for an invalid command, from 2.5 ms to 3.5 ms for a valid close command, and more than 3.5 ms for an invalid command.

The commands are periodically refreshed with a period that is substantially longer than the longest expected pulse width (e.g. in this instance, a refresh of 5 ms for a maximum expected pulse width of 2.5 ms). However, a maximum duration without pulse must be added, e.g. 10 ms if the commands are refreshed every 5 ms, in order to use it as a time threshold for detecting undesirable refresh frequencies or the absence of a command which is thus treated as an invalid command.

Alternatively, amplitude or pulse width modulation may be substituted for dual-tone modulation frequency DTMF. This variant requires, however, resorting to more complex electronics having to carry out the generation of superposed sinusoidal signals on the control board side and to detection by implementing a Goertzel algorithm (Fourier transform optimized for a single frequency) on the switching member side.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A system for controlling electrical power supply of an aircraft, the system comprising:
    at least two control boards; and
    at least two switching members, wherein:
        each control board comprises a processor, each processor being: (i) uni-directionally connected to the at least two switching members, providing redundant electrical power from each of the at least two control boards and their associated processors to the at least two switching members, (ii) directly connected to the at least two switching members with no intermediate members between the control boards and the at least two switching members, and (iii) configured to determine a switching command for switching states of mechanical switch contacts of each switching member and to determine information relating to validity of each switching command; and
        each switching member comprises members for converting and interpreting commands, including: mechanical switch contacts; a detector to detect parallelization; a transmitter to determine a command to be transmitted to the detector, the command selected from the switching commands and the information relating to the validity of each switching command; and a power actuator configured to transmit a power signal to the mechanical switch contacts depending on the command received from the detector; wherein the mechanical switch contacts are configured to selectively open or close an electrical power supply line.

2. The system according to claim 1, wherein each control board is connected to each transmitter through a connection comprising a reference strand and a strand carrying a control current transmitted by the control board.

3. The system according to claim 1, wherein each control board is configured to perform modulation of the switching command for switching the states of the mechanical switch contacts of each switching member and the information relating to the validity of each switching command, and
    wherein each switching member is correspondingly configured to perform demodulation.

4. The system according to claim 3, wherein the modulation comprises amplitude modulation.

5. The system according to claim 3, wherein the modulation comprises pulse width modulation.

6. The system according to claim 3, wherein the modulation comprises dual-tone frequency modulation.

7. The system according to claim 1, wherein:
    each control board further comprises:
        first and second current sources;
        a first switch fixably connected to the first current source and switchably connected to one of the at least two switching members; and
        a second switch fixably connected to the second current source and switchably connected to one of the at least two switching members.

8. The system according to claim 7, wherein the processor of a respective control board is: (i) connected to the first switch via a first terminal that transmits a control signal, (ii) connected to the second switch via a second terminal that transmits a validity signal, and (iii) configured to control a switch state of the first switch using the control signal and control a switch state of the second switch using the validity signal.

* * * * *